US009728791B2

(12) United States Patent
McCluskey et al.

(10) Patent No.: US 9,728,791 B2
(45) Date of Patent: Aug. 8, 2017

(54) SELF-SEALING FLOW FRAME FOR FLOW BATTERY STACK

(71) Applicant: Concurrent Technologies Corporation, Johnstown, PA (US)

(72) Inventors: Michel J. McCluskey, Somerset, PA (US); John Ellsworth Gover, Jr., New Florence, PA (US); Bryan P. Tipton, Johnstown, PA (US); Kevin Anthony Weaver, Johnstown, PA (US); Jennifer Lyne Kronick, Patton, PA (US); David B. Berkey, Johnstown, PA (US); Daniel R. Markiewicz, Johnstown, PA (US)

(73) Assignee: Concurrent Technologies Corporation, Johnstown, PA (US)

( * ) Notice: Subject to any disclaimer, the term of this patent is extended or adjusted under 35 U.S.C. 154(b) by 98 days.

(21) Appl. No.: 14/796,463

(22) Filed: Jul. 10, 2015

(65) Prior Publication Data

US 2016/0036067 A1  Feb. 4, 2016

Related U.S. Application Data

(60) Provisional application No. 62/030,712, filed on Jul. 30, 2014.

(51) Int. Cl.
*H01M 8/02* (2016.01)
*H01M 8/18* (2006.01)
(Continued)

(52) U.S. Cl.
CPC ......... *H01M 8/0273* (2013.01); *H01M 8/006* (2013.01); *H01M 8/0276* (2013.01);
(Continued)

(58) Field of Classification Search
CPC .. H01M 8/0273; H01M 8/006; H01M 8/0276; H01M 8/04276; H01M 8/188; H01M 8/0284; Y02E 60/528
See application file for complete search history.

(56) References Cited

U.S. PATENT DOCUMENTS

2003/0087156 A1*  5/2003  Broman .............. H01M 4/8615
                                                            429/235
2011/0223450 A1*  9/2011  Horne ................. B60L 11/1824
                                                            429/72

(Continued)

FOREIGN PATENT DOCUMENTS

KR          10-1495434    *  1/2015  .......... H01M 8/0273

*Primary Examiner* — Patrick Ryan
*Assistant Examiner* — Aaron Greso
(74) *Attorney, Agent, or Firm* — Buchanan Ingersoll & Rooney PC

(57) ABSTRACT

A self-sealing flow frame is provided having a first frame component and a second frame component. Each frame component is provided with a tongue-and-groove configuration that when assembled forms a tessellation engagement, which creates the seal. When each frame component is assembled into a flow frame, with the inner surfaces facing towards each other, the tongue-and-groove arrangements create a seal profile that circumscribe constituent parts of a device within which the self-sealing flow frame is being employed. As the frame components are compressively secured and fastened together, a tessellation engagement of the seal profile forms the fluid seal. Fluids of the device are prevented from exfiltrating the device, and are contained within the self-sealing flow frame by the fluid seal.

15 Claims, 5 Drawing Sheets

(51) Int. Cl.
*H01M 8/00* (2016.01)
*H01M 8/04* (2016.01)
*H01M 8/0273* (2016.01)
*H01M 8/0276* (2016.01)
*H01M 8/04276* (2016.01)
*H01M 8/0284* (2016.01)

(52) U.S. Cl.
CPC ....... *H01M 8/04276* (2013.01); *H01M 8/188* (2013.01); *H01M 8/0284* (2013.01); *Y02E 60/528* (2013.01)

(56) References Cited

U.S. PATENT DOCUMENTS

| | | | |
|---|---|---|---|
| 2012/0052347 A1* | 3/2012 | Wilson | H01M 8/0232 429/72 |
| 2013/0089767 A1* | 4/2013 | Blacker | H01M 8/188 429/105 |

* cited by examiner

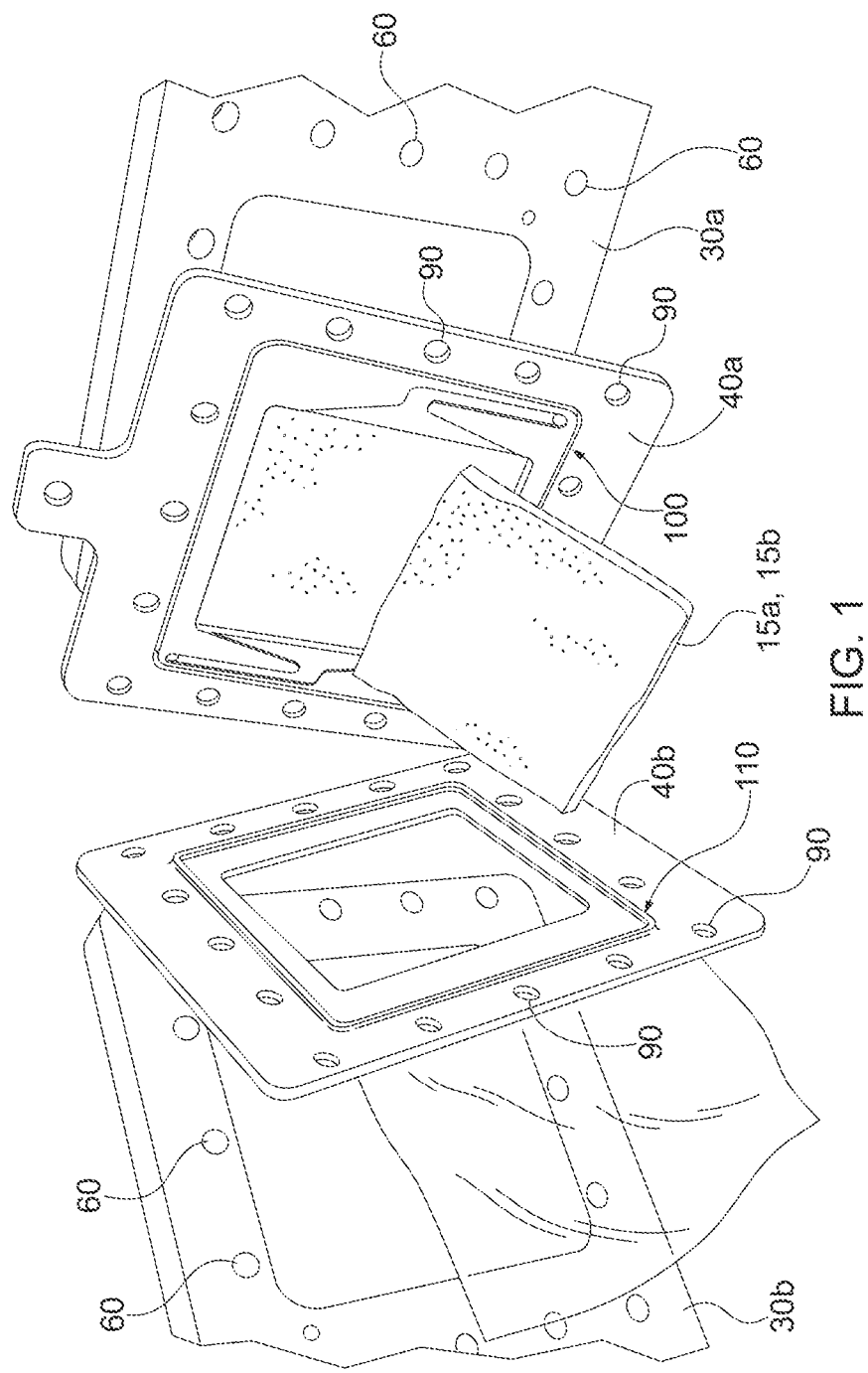

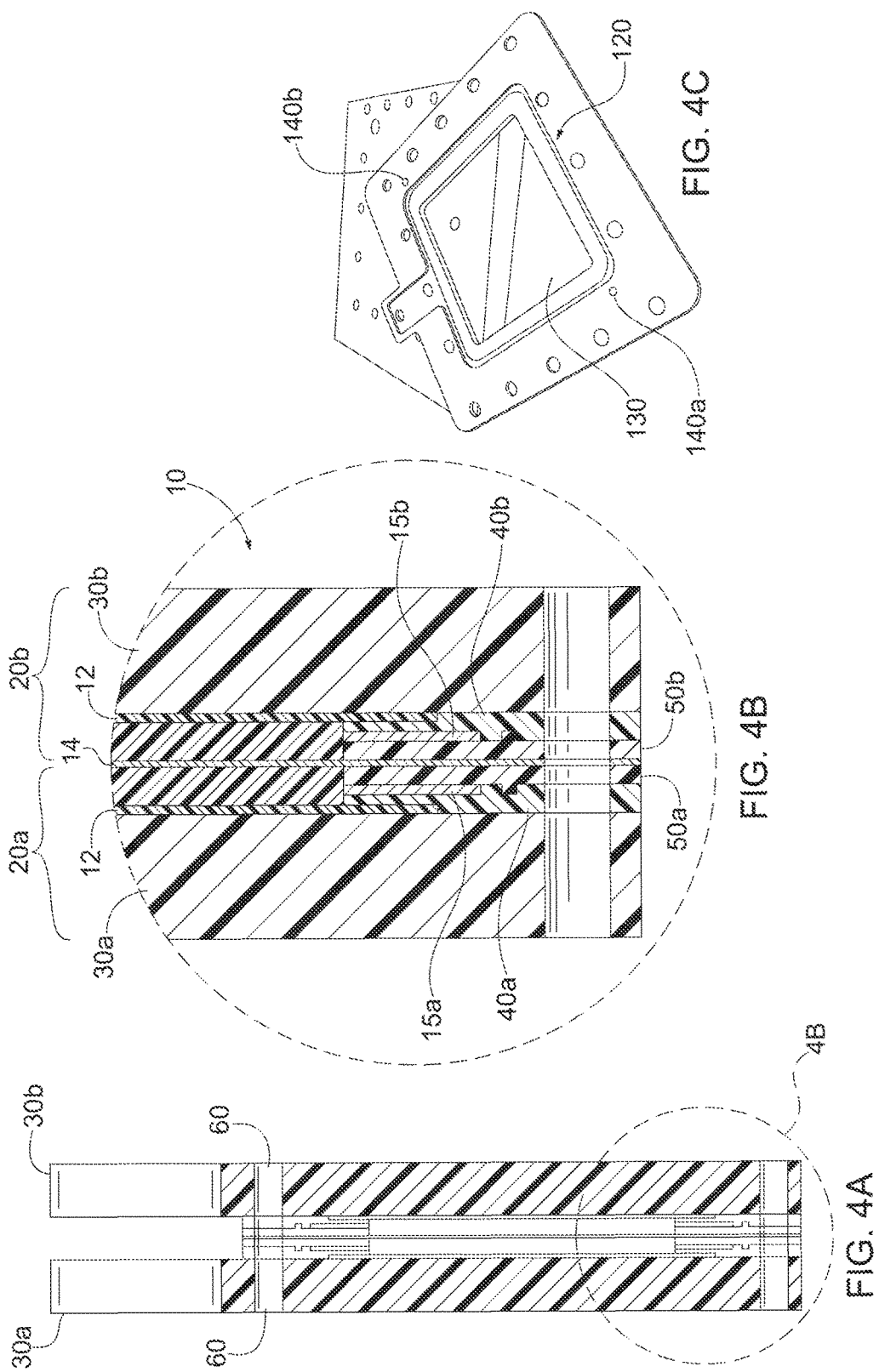

SELF-SEALING FLOW FRAME FOR FLOW BATTERY STACK

CROSS-REFERENCE TO RELATED APPLICATIONS

This patent application claims the benefit of U.S. Provisional Patent Application No. 62/030,712, filed on Jul. 30, 2014, which is hereby incorporated by reference in its entirety.

FIELD OF THE INVENTION

The present invention is directed generally towards a self-sealing framework for a fluid-containing apparatus and, more particularly, directed towards a self-sealing flow frame for a flow battery stack containing electrolyte fluids.

BACKGROUND OF THE INVENTION

A flow battery system is a rechargeable fuel cell exploiting the fluid dynamics, kinetics, and chemical potential properties of fluids containing electroactive elements (i.e., electrolytes) to convert chemical energy to electrical energy. The electrolytes typically comprise a catholyte fluid and an anolyte fluid, where each are stored in separate electrolyte tanks. At least one pump for each tank, directs the electrolytes from the electrolyte tanks and into a cell stack (comprising of one or more cells). The electrolytes come into contact with electrodes to generate electrical energy, which is typically stored in current collectors of the cell stack. A power source or load is placed into electrical communication with the cell(s) to selectively draw electrical power from the flow battery system.

Each cell typically comprises a positive electrode disposed on a first side of a membrane and a negative electrode disposed on a second side of a membrane. The membrane facilitates movement of the electroactive elements and the exchange of electric charges. A flow frame substantially encases the electrodes and membrane, and contains the electrolytes as they are directed into, and out from, the cell stack by the pump(s). The flow frame typically comprises two or more members that are configured to compress the cell components together, and are secured together via a fastener, fused together, or otherwise sealed. The flow frame creates a flow compartment within which the cell components are contained, and it is generally provided with inlets and outlets to facilitate fluid communication with a manifold that is in further fluid communication with the tanks.

In systems with multiple cells, a plurality of cells are arranged in electrical series, with each cell being separated by bipolar plates to facilitate passage of electricity while keeping the electrolytes inside. The bipolar plates create flow sub-compartments, such that each flow sub-compartment has opposite polarities and contains an electrode of a respective polarity. Monopolar plates are typically disposed at terminal ends of the stack, and the electrodes, monopolar plates, and bipolar plates are in electrical communication with the current collectors.

Performance of these flow battery systems is directly related to internal resistance, current transfer efficiency, the feed pressure of the pumps, and material degradation of the component parts. The electrolytes should generally exhibit high ionization and chemical kinetics and have a low viscosity. The electrodes generally should exhibit resistance to acid, have a high specific surface area, and be good electrical conductors. The membrane generally should enable ion transfer, but prevent, or at least inhibit, mixing of the electrolytes, and also exhibit consistent diffusion and electrical resistivity properties. The flow frame members generally should exhibit resistance to acid, maintain a steady compressive force upon the electrodes and membrane, and adequately contain the electrolytes as well as the component parts.

Prior art in this field consists of flow battery systems employing sealants and gaskets, such as rubber O-rings, disposed between the flow frame members to prevent leakage of the electrolyte from the cell. Use of separate seals in the flow battery system poses several problems. These seals tend to degrade, leading to a failure to contain electrolytes. The use of separate seals increases the number of parts comprising the flow battery system, which increases the probability of system failures and adds to manufacturing and maintenance costs.

The present invention is directed toward overcoming one or more of the above-identified problems.

SUMMARY OF THE INVENTION

The self-sealing flow frame for flow battery stack in accordance with the present invention includes a flow frame having a tongue-and-groove configuration that when assembled forms a tessellation engagement, which creates the seal. The flow frame comprises a first frame component and a second frame component. Each frame component is disposed on either ends of the constituent parts of the flow battery stack cell so as to sandwich the constituent parts. Each frame component comprises an end plate and two half-cell plates. The tongue-and-groove configuration is located on inner surfaces of each of the two half-cell plates. Each inner surface of each frame component faces the constituent parts of the flow battery stack cell, where the two half-cell plates of each frame component sandwich the electrodes. Each tongue-and-groove configuration comprises at least one channel and at least one tongue-protrusion that are molded into the inner surfaces of the half-cell plates. In assembly, the first frame component construction would be: a first half-cell plate lying adjacent the membrane; a second half-cell plate abutting the first half-cell plate while sandwiching the electrode; and, a first end plate lying adjacent the second half-cell plate. The same, yet mirrored, serial construction occurs on the other side of the membrane for the second frame component. As the first and second frame components are advanced towards each other and compress the constituent parts of the cell, the tongue-and-groove configurations of the half-cell plates engage, which creates an obstruction to fluid flow due to the tessellation of the engagement.

In a preferred embodiment, the self-sealing frame includes a first frame component having a first end plate with a plurality of first end plate fastening apertures, at least one first end plate inlet port, and at least one first end outlet port. The self-sealing frame further includes a first half-cell having a first half-cell inner surface, a first half-cell outer surface, at least one first half-cell inlet port, and at least one first half-cell outlet port. At least one first connector tab is disposed on an edge of the first half-cell. The self-sealing frame further includes a second half-cell having a second half-cell inner surface, a second half-cell outer surface, at least one second half-cell inlet port, and at least one second half-cell outlet port.

The first half-cell inner surface is provided with at least one channel or at least one tongue-protrusion, and the second half-cell inner surface is provided with at least one tongue-protrusion or at least one channel. Each channel and each tongue-protrusion is a contiguous concentric formation, such that profiles of each individual channel complement profiles of each individual tongue-protrusion so as to substantially align when the first half-cell inner surface is mated with the second half-cell inner surface to generate a first seal profile.

The first and second half-cells are further provided with half-cell fastening apertures disposed about a perimeter of each first and second half-cell, where each individual half-cell fastening aperture substantially aligns with an individual end plate fastening aperture when the first end plate is mated with said first and second half-cells. The first half-cell is provided with a first current collector aperture disposed in a central portion thereof and configured to contain, yet expose, an ancillary current collector on the first half-cell outer surface.

The self-sealing frame further includes a second frame component having a second end plate with a plurality of second end plate fastening apertures, at least one second end plate inlet port, and at least one second end outlet port. The self-sealing frame further includes a third half-cell having a third half-cell inner surface, a third half-cell outer surface, at least one third half-cell inlet port, and at least one third half-cell outlet port. At least one second connector tab is disposed on an edge of said third half-cell. The self-sealing frame further includes a fourth half-cell having a fourth half-cell inner surface, a fourth half-cell outer surface, at least one fourth half-cell inlet port, and at least one fourth half-cell outlet port.

The third half-cell inner surface is provided with at least one channel or at least one tongue-protrusion. The fourth half-cell inner surface is provided with at least one tongue-protrusion or at least one channel. Each channel and each tongue-protrusion is a contiguous concentric formation such that profiles of each individual channel complement profiles of each individual tongue-protrusion so as to substantially align when the third half-cell inner surface is mated with the fourth half-cell inner surface to generate a second seal profile.

The third and fourth half-cells are provided with half-cell fastening apertures disposed about a perimeter of each third and fourth half-cell, where each individual half-cell fastening aperture substantially aligns with an individual end plate fastening aperture when the second end plate is mated with the third and fourth half-cells. The third half-cell is provided with a second current collector aperture disposed in a central portion thereof and configured to contain, yet expose, an ancillary current collector on the third half-cell outer surface.

The first frame component and second frame component are configured to be placed in serial construction within a device having constituent parts and a fluid such that the first and second frame components sandwich the constituent parts and contain the fluid. The first and second seal profiles form a tessellation engagement with the constituent parts when the first and second frame components are compressively secured to each other. This tessellation engagement forms a fluid seal to prevent exfiltration or leakage of the fluid while the device is subject to positive pressure. Each of the inlet and outlet ports facilitate fluid communication with an ancillary manifold of the device. The first and second connector tabs facilitate electrical communication between the device and an ancillary load.

Other preferred embodiments include at least one of the first end plate and second end plate being planar. Some preferred embodiments provide for at least one of the half-cells to comprise polyphenylene sulfide or polyvinylidene fluoride. Of course, as will be appreciated by one skilled in the art, other materials having similar properties may be utilized. Another preferred embodiment has the seal profiles of each frame component configured to circumscribe the constituent parts of the device.

It is an object of the present invention to provide a flow frame for a flow battery stack having a first frame component and a second frame component, each having half-cells with a tongue-and-groove engagement arrangement.

It is a further object of the present invention to configure the tongue-and-groove arrangements to form a tessellation engagement when a first frame component and a second frame component are placed in serial construction with a device having constituent parts and a fluid.

It is a further object of the present invention to configure the tongue-and-groove arrangement to enable the tessellation engagement to create a fluid seal when the first frame component and second frame component are used to compress the constituent parts, such that the first and second frame components sandwich the constituent parts and contain the fluid of the device even when that device is subject to a positive pressure, thereby eliminating the need for O-rings, gaskets, or other sealing devices and sealants.

It is a further object of the present invention to provide a current collector aperture within at least one frame component to contain, yet expose, a current collector.

It is a further object of the present invention to provide at least one inlet port and at least one outlet port within at least one of the first frame component and second frame component to facilitate fluid communication with a manifold of the device.

It is a further object of the present invention to provide a least one of the first frame component and second frame component with at least one connector tab to facilitate electrical communication between the device and an ancillary load.

It is a further object of the present invention to provide fastening apertures such that torqueing fasteners applied through the fastening apertures enables the tessellation engagement to form an adequate and continuous seal about the perimeter of the seal profile.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present invention will be more apparent from the following more particular description thereof, presented in conjunction with the following drawings, in which:

FIG. 1 is a perspective view of the self-sealing flow frame of the present invention separated into its component parts;

FIG. 4A illustrates a cross-sectional side view of the self-sealing flow frame of the present invention showing the parts in assemblage within a flow battery stack system;

FIG. 4B illustrates an exploded partial cross-sectional side view of the self-sealing flow frame of the present invention showing the parts in assemblage within a flow battery stack system;

FIG. 4C illustrates perspective views of a first half-cell and a first end plate of the present invention;

DETAILED DESCRIPTION OF THE INVENTION

Figure 3:
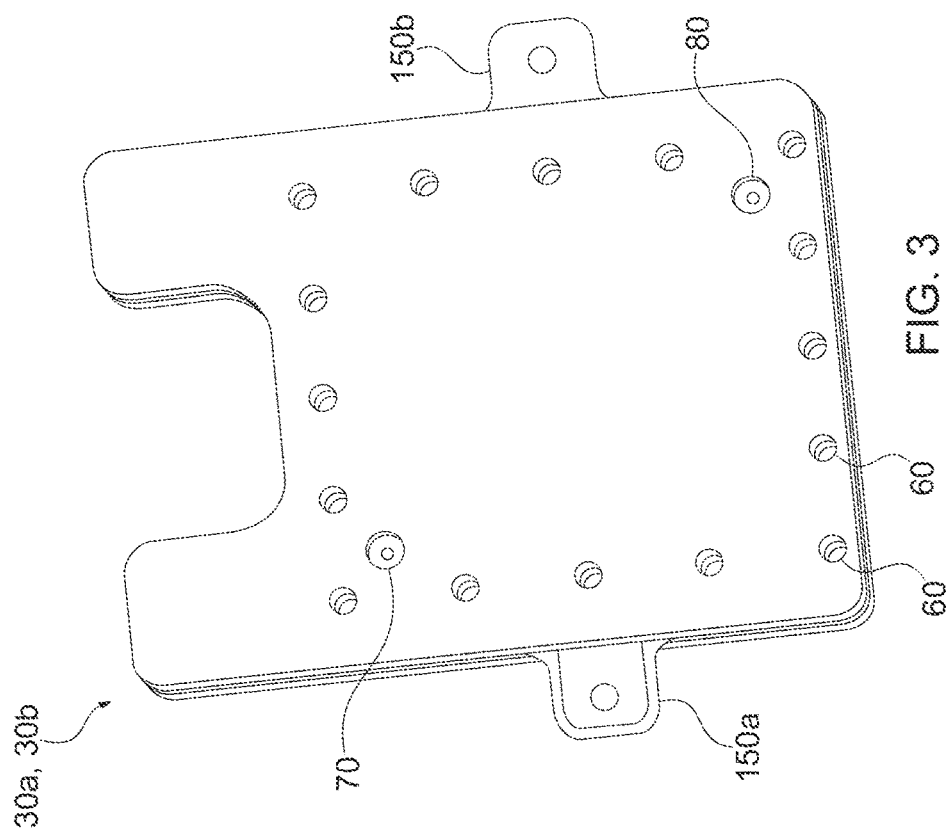
FIG. 3 is a perspective front view of the self-sealing flow frame of the present invention showing the parts in assemblage.
Figure 2:
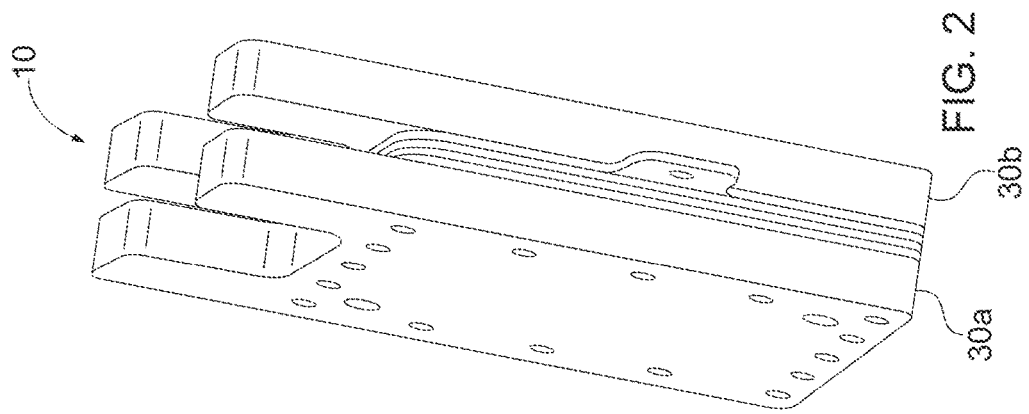
FIG. 2 is a perspective side view of the self-sealing flow frame of the present invention showing the parts in assemblage.

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Referring now to FIGS. 1-6, views of the self-sealing flow frame 10 separated into its component parts and in assemblage, in accordance with a preferred embodiment, are disclosed. The self-sealing flow frame 10 is a framework that is intended to be used within a flow battery stack 11 (see FIG. 5); however, the self-sealing flow frame 10 is certainly not limited to such application. The self-sealing flow frame 10 exploits a tongue-and-groove configuration when sandwiching and compressing component parts of a device to contain fluids within that device without the need for separate and additional seals or gaskets; therefore, it can be appreciated that the self-sealing flow frame 10 can be used for analogous applications. The description of the self-sealing flow frame 10 will be as it is applied to a flow battery stack 11, but this description is for exemplary purposes and is not intended to limit the use thereto.

The self-sealing flow frame 10 includes a first frame component 20a and a second frame component 20b. The second frame component 20b is identical, or in some cases mirrored, to the first frame component 20a, so for the sake of brevity and ease of illustration only one frame component 20a, 20b may be described in detail with the understanding that the other is identical or mirrored. The first frame component 20a comprises a first end plate 30a, a first half-cell 40a, and a second half-cell 50a. Similarly, the second frame component 20b comprises a second end plate 30b, and two half-cells 40b, 50b. Each end plate 30a, 30b is a planar, rectangular member that is, in one exemplary embodiment, approximately twenty-four inches in width, eighteen inches in height, and one-fourth inches in depth; however, other shapes and dimensions may be utilized without deviating from the teachings of the self-sealing flow frame 10. Each end plate 30a, 30b is configured to contain the half-cells 40a, 40b, 50a, 50b and constituent parts of the battery cell 11 in assemblage, and to facilitate flow of electrolyte into, and out from, the battery cell 11. In this regard, each end plate 30a, 30b is provided with a plurality of end plate fastening apertures 60, which are configured to receive fasteners, such as bolts, so that torqueing the fasteners advances each end plate 30a, 30b towards each other when the end plates 30a, 30b are disposed on either ends of the constituent parts of the flow battery stack cell 11, thereby sandwiching the constituent parts. Each end plate 30a, 30b is further provided with end plate inlet ports 70 and end plate outlet ports 80 to facilitate fluid communication to a manifold of the flow battery system 11.

Each half-cell 40a, 40b, 50a, 50b has an inner surface 41a, 51a and an outer surface 41b, 51b. A plurality of half-cell fastening apertures 90 are disposed about the perimeter of the each half-cell 40a, 40b, 50a, 50b, which are in alignment with the end plate fastening apertures 60 to facilitate securement of the first and second frame components 20a, 20b to each other via fasteners, such as bolts. Each half-cell 40a, 40b, 50a, 50b comprises a material that is non-reactive, acid resistant, and resilient, such as, for example, polyphenylene sulfide or polyvinylidene fluoride. The non-reactiveness is necessitated by the requirement to obviate repugnancy in chemical ionization reactions. The acid resistance is necessitated by the requirement to prevent material degradation due to contact with electrolytes. The resilient property is necessitated by the requirement to generate a seal between the first half-cells 40a, 40b and second half-cells 50a, 50b when under compressive forces; therefore, the frame components 20a, 20b must be able to be subjected to compressive forces without plastic deformation.

Referring now to FIGS. 4A, 4B, 4C, 5, and 6, views of the self-sealing flow frame 10 showing the parts in assemblage within a flow battery stack system 11, in accordance with a preferred embodiment, are disclosed. Each first half-cell 40a, 40b is provided with at least one channel 100, and each second half-cell 50a, 50b is provided with at least one tongue-protrusion 110. It is understood that the channel 100 can be provided on each second half-cell 50a, 50b and tongue-protrusion 110 on each first half-cell 40a, 40b without deviating from the teachings of the self-sealing flow frame 10. Each channel 100 is a contiguous concentric formation on the inner surface 41a, 51a, and each tongue-protrusion 110 is similarly a contiguous concentric formation on the inner surface 41a, 51a. The profiles of the channel(s) 100 and tongue-protrusion(s) 110 complement each other so that they align when a first half-cell 40a, 40b is mated with a second half-cell 50a, 50b.

When mated, each individual channel 100 engages with each individual tongue-protrusion 110 to produce a contiguous seal profile 120 that circumscribes constituent parts (at least one electrode and a membrane) of a flow battery stack system 11. In use, the first half-cell 40a, 40b and second half-cell 50a, 50b sandwich the electrode 15a, 15b within the contiguous seal profile. When the first frame component 20a is advanced towards the second frame component 20b to compress the constituent parts of the flow battery system 11, the channels 100 engage the tongue-protrusions 110 while sandwiching the electrodes within the seal profiles 120. Each channel 100 and tongue-protrusion 110 engagement creates a tessellation engagement that seals the electrolyte fluid 17a, 17b within the flow compartment 16 (see FIG. 6). The compression of the frame components 20a, 20b, along with the tessellation engagement, create a fluid barrier that prevents electrolyte fluid 17a, 17b from escaping the cell stack 11 even during operation when the cell stack 11 is under positive pressure from the pumps 19a, 19b. The flow frame 10 seals by merely being assembled, and obviates the need for separate seals and gaskets.

The spacing of fastening apertures 60, 90 relative to the seal profile 120 and the number of fastening apertures 60, 90 must be such that torqueing the fasteners will enable the tessellation engagement to form an adequate and continuous seal about the perimeter of the seal profile 120.

Figure 6:
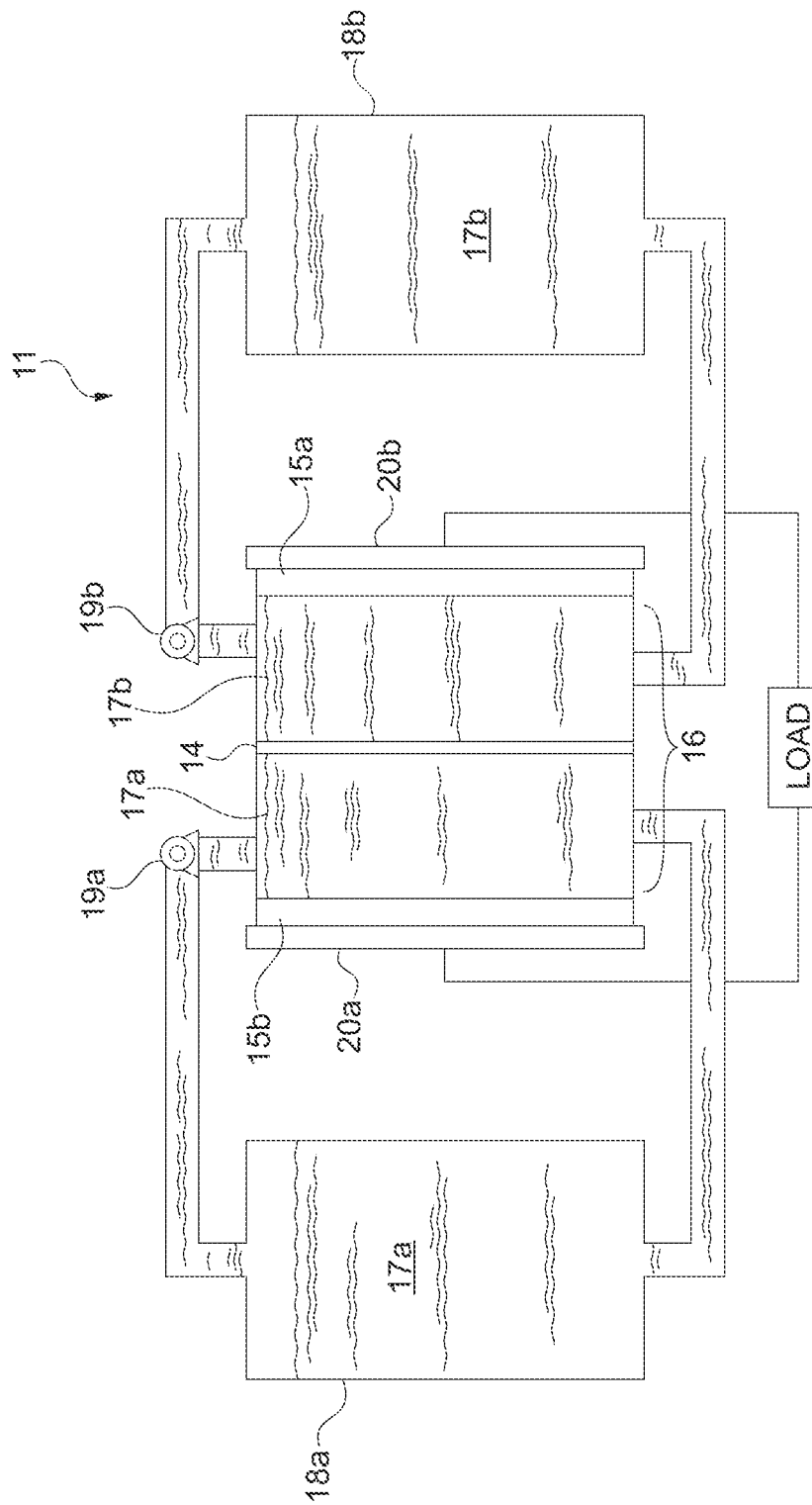

Referring now to FIG. 6, a schematic the self-sealing flow frame 10 being used with a typical flow battery stack system 11, in accordance with the preferred embodiment, is disclosed. FIG. 6 illustrates a typical flow battery cell stack architecture 11 arranged with the self-sealing flow frame 10. This battery cell stack architecture 11 is common and well known in the art, and is used as an example to illustrate the utilization of the self-sealing flow frame 10. It is understood that one skilled in the art would easily and without undue experimentation apply the self-sealing flow frame 10 to any variety of battery cell stack architectures 11.

A simple battery cell stack architecture 11 comprises a membrane 14 with a positive electrode 15a disposed on one side of the membrane 14 and a negative electrode 15b disposed on the opposite side of the membrane 14. The first frame component 20a is shown here being placed adjacent to the negative electrode 15b while the second frame component 20b is placed adjacent to the positive electrode 15a; however, other configurations may be utilized. When assembled, the flow frame 10 creates a flow compartment 16. A catholyte fluid 17a is contained within the catholyte tank 18a, which is in fluid communication with each negative electrode 15b via a catholyte pump 19a. An anolyte fluid 17b is contained within the anolyte tank 18b, which is in fluid communication with each positive electrode 15a via an anolyte pump 19b.

Figure 5:
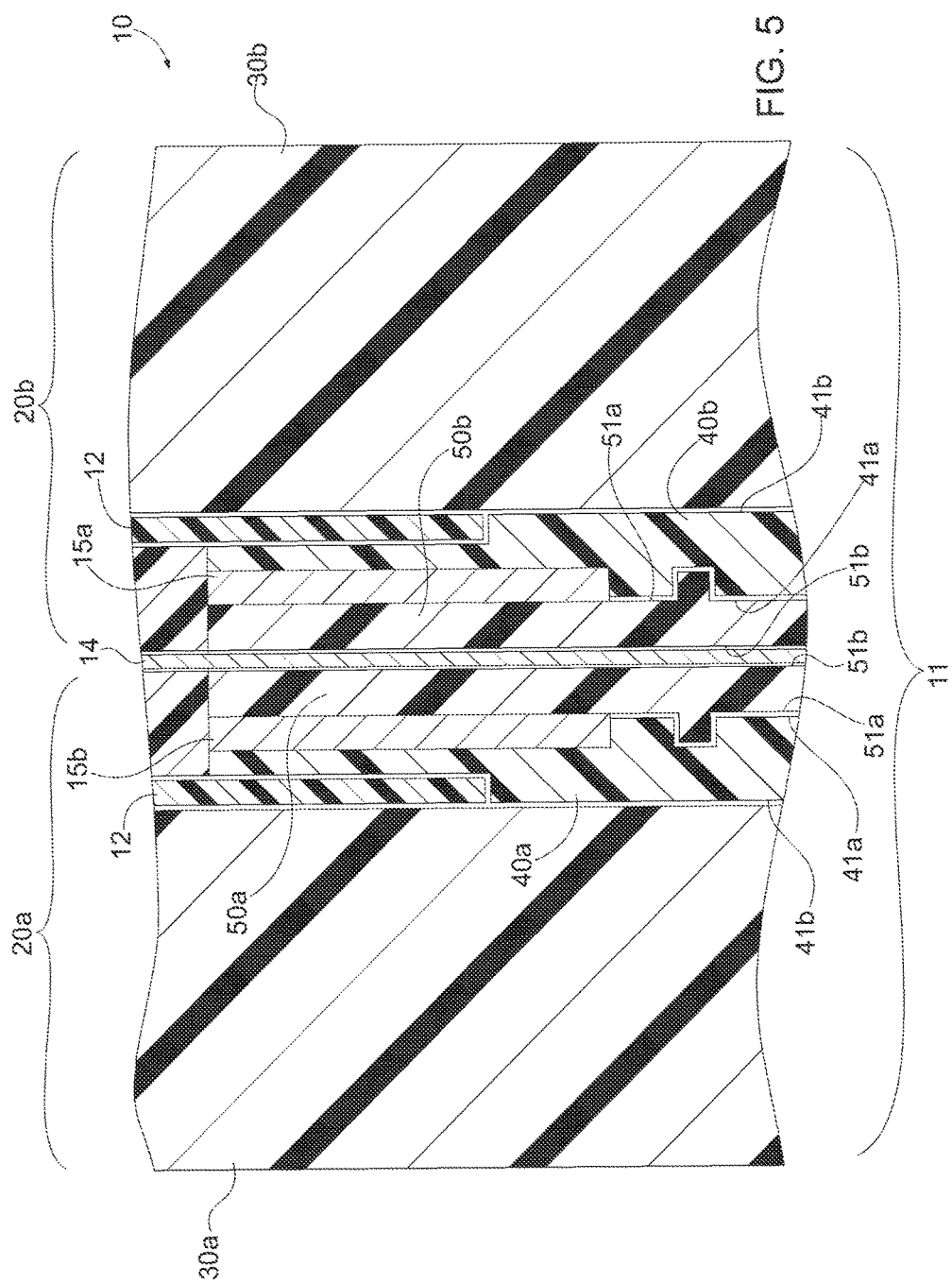
FIG. 5 is another exploded partial cross-sectional side view of the self-sealing flow frame of the present invention showing the parts in assemblage within a flow battery stack system; and, FIG. 6 is a schematic the self-sealing flow frame of the present invention being used with a typical flow battery stack system.

Referring now back to FIGS. 1, 4C, and 5 in an alternative embodiment, a current collector aperture 130 is disposed in a central portion of at least one of the first half-cells 40a, 40b to facilitate containing, yet exposing, a current collector 12 of the flow battery stack 11. In this embodiment, the least one channel 100 and/or tongue-protrusion 110 is formed into the inner surface 41a, 51a concentrically with the current collector aperture 130 so that the at least one channel 100 and/or tongue-protrusion 110 circumscribes the current collector 12 when the self-sealing flow frame 10 is assembled. The current collector aperture 130 is preferably configured to retain the current collector 12 on the outer surface 41b, 51b of the first half-cell 40a, 40b.

In an alternative embodiment, at least one half-cell inlet port 140a and at least one half-cell outlet port 140b are disposed in at least one of the first half-cells 40a, 40b and second half-cells 5a, 50b to facilitate fluid communication with a manifold of the flow battery stack system 11. Each individual half-cell inlet port 140a is configured to fluidly communicate with an individual end plate inlet port 70, and each individual half-cell outlet port 140b is configured to fluidly communicate with an individual end plate outlet port 80.

In an alternative embodiment, at least one connector tab 150a, 150b is disposed on a first half-cell 40a, 40b (see FIG. 3). Each connector tab 150a, 150b is configured to extend from an edge of the first half-cell 40a, 40b so as to protrude from edges of the first and second frame components 20a, 20b when the self-sealing flow frame 10 is assembled. Each connector tab 150a, 150b is further configured to enable transmission of electrical energy between the load and battery cell 11. As the first frame component 20a is shown encasing the negative electrode 15b and the second frame component 20b is encasing the positive electrode 15a, the tab connector 150a, 150b of the first half-cell 40a of the first frame component 20a would be the negative connector tab 150a and the that of the second frame component 20b would be the positive connector tab 150b.

Additional serial construction configurations may be employed without deviating from the teachings of the self-sealing flow frame 10, such as but not limited to, providing bipolar plates (not shown) between each end plate 30a, 30b and each first half-cell 40a, 40b. Additional membranes (not shown) may be included between the first and second half-cells 40a, 40b, 50a, 50b.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range.

We claim:

1. A self-sealing frame, comprising:
    a first frame component, comprising:
        a first end plate having a plurality of first end plate fastening apertures;
        a first half-cell having a first half-cell inner surface and a first half-cell outer surface; and,
        a second half-cell having a second half-cell inner surface and a second half-cell outer surface;
        wherein said first half-cell inner surface is provided with at least one channel or at least one tongue-protrusion;
        wherein said second half-cell inner surface is provided with at least one tongue-protrusion or at least one channel;
        wherein each channel and each tongue-protrusion is a contiguous concentric formation such that profiles of each individual channel complement profiles of each individual tongue-protrusion so as to substantially align when said first half-cell inner surface is mated with said second half-cell inner surface to generate a first seal profile; and,
        wherein said first and second half-cells are provided with half-cell fastening apertures disposed about a perimeter of each first and second half-cell, each individual half-cell fastening aperture substantially aligns with an individual end plate fastening aperture when said first end plate is mated with said first and second half-cells;
    a second frame component, comprising:
        a second end plate having a plurality of second end plate fastening apertures;
        a third half-cell having a third half-cell inner surface and a third half-cell outer surface; and,
        a fourth half-cell having a fourth half-cell inner surface and a fourth half-cell outer surface;
        wherein said third half-cell inner surface is provided with at least one channel or at least one tongue-protrusion;
        wherein said fourth half-cell inner surface is provided with at least one tongue-protrusion or at least one channel;
        wherein each channel and each tongue-protrusion is a contiguous concentric formation such that profiles of each individual channel complement profiles of each individual tongue-protrusion so as to substantially align when said third half-cell inner surface is mated with said fourth half-cell inner surface to generate a second seal profile; and,
        wherein said third and fourth half-cells are provided with half-cell fastening apertures disposed about a perimeter of each third and fourth half-cell, each individual half-cell fastening aperture substantially aligns with an individual end plate fastening aperture when said second end plate is mated with said third and fourth half-cells;

wherein said first frame component and said second frame component are configured to be placed in serial construction within a device comprising an electrode, a membrane, and a fluid such that said first and second frame components sandwich said electrode and said membrane and contain said fluid; and, wherein said first and second seal profiles form a tessellation engagement when said first and second frame components are compressively secured to each other, said tessellation engagement forming a fluid seal circumscribing said electrode and said membrane to prevent exfiltration of said fluid while said device is subject to positive pressure.

2. The frame recited in claim 1, wherein at least one of said first end plate and second end plate is planar.

3. The frame recited in claim 1, wherein at least one of said first half-cell, said second half-cell, said third half-cell, and said fourth half-cell comprise polyphenylene sulfide.

4. The frame recited in claim 1, wherein at least one of said first half-cell, said second half-cell, said third half-cell, and said fourth half-cell comprise polyvinylidene fluoride.

5. The frame recited in claim 1, wherein said first and second seal profiles are configured to circumscribe said constituent parts.

6. A self-sealing frame, comprising:
a first frame component, comprising:
    a first end plate having a plurality of first end plate fastening apertures;
    a first half-cell having a first half-cell inner surface and a first half-cell outer surface; and,
    a second half-cell having a second half-cell inner surface and a second half-cell outer surface;
    wherein said first half-cell inner surface is provided with at least one channel or at least one tongue-protrusion;
    wherein said second half-cell inner surface is provided with at least one tongue-protrusion or at least one channel;
    wherein each channel and each tongue-protrusion is a contiguous concentric formation such that profiles of each individual channel complement profiles of each individual tongue-protrusion so as to substantially align when said first half-cell inner surface is mated with said second half-cell inner surface to generate a first seal profile;
    wherein said first and second half-cells are provided with half-cell fastening apertures disposed about a perimeter of each first and second half-cell, each individual half-cell fastening aperture substantially aligns with an individual end plate fastening aperture when said first end plate is mated with said first and second half-cells; and,
    wherein said first half-cell is provided with a first current collector aperture disposed in a central portion thereof and configured to contain, yet expose, a current collector on said first half-cell outer surface;
a second frame component, comprising:
    a second end plate having a plurality of second end plate fastening apertures;
    a third half-cell having a third half-cell inner surface and a third half-cell outer surface; and,
    a fourth half-cell having a fourth half-cell inner surface and a fourth half-cell outer surface;
    wherein said third half-cell inner surface is provided with at least one channel or at least one tongue-protrusion;
    wherein said fourth half-cell inner surface is provided with at least one tongue-protrusion or at least one channel;
    wherein each channel and each tongue-protrusion is a contiguous concentric formation such that profiles of each individual channel complement profiles of each individual tongue-protrusion so as to substantially align when said third half-cell inner surface is mated with said fourth half-cell inner surface to generate a second seal profile;
    wherein said third and fourth half-cells are provided with half-cell fastening apertures disposed about a perimeter of each third and fourth half-cell, each individual half-cell fastening aperture substantially aligns with an individual end plate fastening aperture when said second end plate is mated with said third and fourth half-cells; and,
    wherein said third half-cell is provided with a second current collector aperture disposed in a central portion thereof and configured to contain, yet expose, a current collector on said third half-cell outer surface;
wherein said first frame component and said second frame component are configured to be placed in serial construction within a device comprising an electrode, a membrane, and a fluid such that said first and second frame components sandwich said electrode and said membrane and contain said fluid; and,
wherein said first and second seal profiles form a tessellation engagement when said first and second frame components are compressively secured to each other, said tessellation engagement forming a fluid seal circumscribing said electrode and said membrane to prevent exfiltration of said fluid while said device is subject to positive pressure.

7. The frame recited in claim 6, wherein at least one of said first end plate and second end plate is planar.

8. The frame recited in claim 6, wherein at least one of said first half-cell, said second half-cell, said third half-cell, and said fourth half-cell comprise polyphenylene sulfide.

9. The frame recited in claim 6, wherein at least one of said first half-cell, said second half-cell, said third half-cell, and said fourth half-cell comprise polyvinylidene fluoride.

10. The frame recited in claim 6, wherein said first and second seal profiles are configured to circumscribe said constituent parts.

11. A self-sealing frame, comprising:
a first frame component, comprising:
    a first end plate having a plurality of first end plate fastening apertures, at least one first end plate inlet port, and at least one first end outlet port;
    a first half-cell having a first half-cell inner surface, a first half-cell outer surface, at least one first half-cell inlet port, and at least one first half-cell outlet port;
    at least one first connector tab disposed on an edge of said first half-cell; and,
    a second half-cell having a second half-cell inner surface, a second half-cell outer surface, at least one second half-cell inlet port, and at least one second half-cell outlet port;
    wherein said first half-cell inner surface is provided with at least one channel or at least one tongue-protrusion;

wherein said second half-cell inner surface is provided with at least one tongue-protrusion or at least one channel;

wherein each channel and each tongue-protrusion is a contiguous concentric formation such that profiles of each individual channel complement profiles of each individual tongue-protrusion so as to substantially align when said first half-cell inner surface is mated with said second half-cell inner surface to generate a first seal profile;

wherein said first and second half-cells are provided with half-cell fastening apertures disposed about a perimeter of each first and second half-cell, each individual half-cell fastening aperture substantially aligns with an individual end plate fastening aperture when said first end plate is mated with said first and second half-cells; and, wherein said first half-cell is provided with a first current collector aperture disposed in a central portion thereof and configured to contain, yet expose, a current collector on said first half-cell outer surface;

a second frame component, comprising:
  a second end plate having a plurality of second end plate fastening apertures, at least one second end plate inlet port, and at least one second end outlet port;
  a third half-cell having a third half-cell inner surface, a third half-cell outer surface, at least one third half-cell inlet port, and at least one third half-cell outlet port;
  at least one second connector tab disposed on an edge of said third half-cell; and,
  a fourth half-cell having a fourth half-cell inner surface, a fourth half-cell outer surface at least one fourth half-cell inlet port, and at least one fourth half-cell outlet port;

wherein said third half-cell inner surface is provided with at least one channel or at least one tongue-protrusion;

wherein said fourth half-cell inner surface is provided with at least one tongue-protrusion or at least one channel;

wherein each channel and each tongue-protrusion is a contiguous concentric formation such that profiles of each individual channel complement profiles of each individual tongue-protrusion so as to substantially align when said third half-cell inner surface is mated with said fourth half-cell inner surface to generate a second seal profile;

wherein said third and fourth half-cells are provided with half-cell fastening apertures disposed about a perimeter of each third and fourth half-cell, each individual half-cell fastening aperture substantially aligns with an individual end plate fastening aperture when said second end plate is mated with said third and fourth half-cells; and, wherein said third half-cell is provided with a second current collector aperture disposed in a central portion thereof and configured to contain, yet expose, a current collector on said third half-cell outer surface;

wherein said first frame component and said second frame component are configured to be placed in serial construction within a device comprising an electrode, a membrane, and a fluid such that said first and second frame components sandwich said electrode and said membrane and contain said fluid;

wherein said first and second seal profiles form a tessellation engagement when said first and second frame components are compressively secured to each other, said tessellation engagement forming a fluid seal circumscribing said electrode and said membrane to prevent exfiltration of said fluid while said device is subject to positive pressure;

wherein each first end plate inlet port, first end outlet port, first half-cell inlet port, first half-cell outlet port, second half-cell inlet port, second half-cell outlet port, second end plate inlet port, second end outlet port, third half-cell inlet port, third half-cell outlet port, fourth half-cell inlet port, and fourth half-cell outlet port facilitate fluid communication with a manifold of said device; and, where said first and second connector tabs facilitate electrical communication between said device and a load.

12. The frame recited in claim 11, at least one of said first end plate and second end plate is planar.

13. The frame recited in claim 11, wherein at least one of said first half-cell, said second half-cell, said third half-cell, and said fourth half-cell comprise polyphenylene sulfide.

14. The frame recited in claim 11, wherein at least one of said first half-cell, said second half-cell, said third half-cell, and said fourth half-cell comprise polyvinylidene fluoride.

15. The frame recited in claim 11, wherein said first and second seal profiles are configured to circumscribe said constituent parts.

\* \* \* \* \*